(12) United States Patent
Ardanese et al.

(10) Patent No.: US 8,468,808 B2
(45) Date of Patent: Jun. 25, 2013

(54) OPTIMIZATION OF ACTIVE REGENERATION TRIGGERS BASED ON AMBIENT AND VEHICLE OPERATING CONDITIONS

(75) Inventors: Raffaello Ardanese, Troy, MI (US); Michelangelo Ardanese, Ann Arbor, MI (US); Christopher Whitt, Howell, MI (US); Paul Jasinkiewicz, Northville, MI (US)

(73) Assignee: GM Global Technology Operations LLC, Detroit, MI (US)

(*) Notice: Subject to any disclaimer, the term of this patent is extended or adjusted under 35 U.S.C. 154(b) by 327 days.

(21) Appl. No.: 12/832,440

(22) Filed: Jul. 8, 2010

(65) Prior Publication Data
US 2012/0006008 A1    Jan. 12, 2012

(51) Int. Cl.
*F01N 3/00* (2006.01)
(52) U.S. Cl.
USPC ............ 60/295; 60/284; 60/286; 60/285
(58) Field of Classification Search
USPC ............ 60/295, 286, 285, 284; 701/102, 701/103, 114
See application file for complete search history.

(56) References Cited

U.S. PATENT DOCUMENTS

| | | | |
|---|---|---|---|
| 5,287,698 A * | 2/1994 | Shinzawa et al. | 60/286 |
| 5,319,930 A * | 6/1994 | Shinzawa et al. | 60/286 |
| 7,065,960 B2 | 6/2006 | Gioannini | |
| 7,251,931 B2 * | 8/2007 | Nonoyama et al. | 60/297 |
| 2006/0026950 A1 | 2/2006 | Kondou et al. | |
| 2010/0011750 A1 | 1/2010 | Onodera et al. | |
| 2010/0192548 A1 * | 8/2010 | Irlbeck et al. | 60/287 |

FOREIGN PATENT DOCUMENTS

| | | |
|---|---|---|
| CN | 1757886 A | 4/2006 |
| CN | 101583778 A | 11/2009 |
| DE | 602004008862 T2 | 6/2008 |
| DE | 1020060555562 A1 | 6/2008 |

* cited by examiner

*Primary Examiner* — Thomas Denion
*Assistant Examiner* — Anthony Ayala Delgado
(74) *Attorney, Agent, or Firm* — Quinn Law Group, PLLC

(57) ABSTRACT

A method of controlling the regeneration of a particulate filter includes defining a regeneration trigger limit for at least one operating parameter of the vehicle, modifying the regeneration trigger limit based upon a sensed ambient operating condition and a sensed vehicle operating condition to define a modified regeneration trigger limit, and regenerating the particulate filter when the modified regeneration trigger limit for the operating parameter is reached.

14 Claims, 2 Drawing Sheets

OPTIMIZATION OF ACTIVE REGENERATION TRIGGERS BASED ON AMBIENT AND VEHICLE OPERATING CONDITIONS

TECHNICAL FIELD

The method generally relates to a method of controlling regeneration of a particulate filter of an exhaust system of a vehicle.

BACKGROUND

An exhaust system for a vehicle may include a particulate filter. If the engine includes a diesel engine, then the particulate filter is referred to as a diesel particulate filter. The particulate filter traps particulate matter, i.e., soot, from the exhaust gas of the engine. The particulate filter may include one or more substrates that define a plurality of apertures, through which the exhaust gas must flow. The particulate matter collects on the substrate as the exhaust gas flows through the apertures. The particulate filter is occasionally regenerated to remove the collected particulate matter. Regeneration of the particulate filter includes heating the particulate filter to a temperature sufficient to burn the collected particulate matter, which converts the particulate matter to carbon dioxide that dissipates into the atmosphere.

A soot model may be employed to predict when the particulate filter is required to be regenerated. A pressure differential across the particulate filter, i.e., between an upstream end and a downstream end of the particulate filter, is one of the primary inputs into the soot model. The soot model predicts the necessity of regeneration based upon the pressure differential across the particulate filter or the time until regeneration is required. Auxiliary regeneration triggers, such as a pre-defined time between consecutive regenerations, a pre-defined distance traveled by the vehicle between consecutive regenerations, or pre-defined fuel consumption of the vehicle between consecutive regenerations may also be employed to start regeneration of the particulate filter. Accordingly, upon the occurrence of any of the auxiliary triggers, regeneration of the particulate filter may be started.

SUMMARY

A method of controlling regeneration of a particulate filter of an exhaust system of a vehicle is provided. The method includes defining a regeneration trigger limit for at least one operating parameter of the vehicle, sensing at least one ambient operating condition, and sensing at least one vehicle operating condition. The method further includes modifying the regeneration trigger limit based upon the sensed at least one ambient operating condition and the sensed at least one vehicle operating condition to define a modified regeneration trigger limit, and regenerating the particulate filter when the modified regeneration trigger limit for the operating parameter is reached.

A method of controlling regeneration of a particulate filter of an exhaust system of a vehicle is also provided. The method includes sensing a pressure differential between an upstream pressure of the particulate filter and a downstream pressure of the particulate filter, and comparing the sensed pressure differential to a soot model to predict when regeneration of the particulate filter is required. The method further includes defining a regeneration trigger limit for at least one operating parameter of the vehicle, sensing at least one ambient operating condition, and sensing at least one vehicle operating condition. The method further includes modifying the regeneration trigger limit based upon the sensed at least one ambient operating condition and the sensed at least one vehicle operating condition to define a modified regeneration trigger limit, and regenerating the particulate filter when either the modified regeneration trigger limit for the operating parameter is reached, or the soot model predicts that regeneration is required.

Accordingly, by modifying the regeneration trigger limit for the at least one operating parameter, the different ambient operating conditions in which the vehicle is operated in and the different vehicle operating conditions at which the vehicle is operated at may be factored into the determination of when regeneration of the particulate filter occurs. Accordingly, if a high level of confidence exists in the soot model prediction, then the time period between consecutive regenerations of the particulate filter may be lengthened, whereas if a low level of confidence exists in the soot model prediction, then the time period between consecutive regenerations of the particulate filter may be shortened. As such, when the vehicle is operated in conditions that produce less soot, i.e., particulate matter, than the soot model may predict, these operating conditions are considered and may lengthen the time period between consecutive regenerations, thereby increasing fuel efficiency of the vehicle and extending the life expectancy of the particulate filter and other associated components.

The above features and advantages and other features and advantages of the present invention are readily apparent from the following detailed description of the best modes for carrying out the invention when taken in connection with the accompanying drawings.

DETAILED DESCRIPTION

Figure 1:
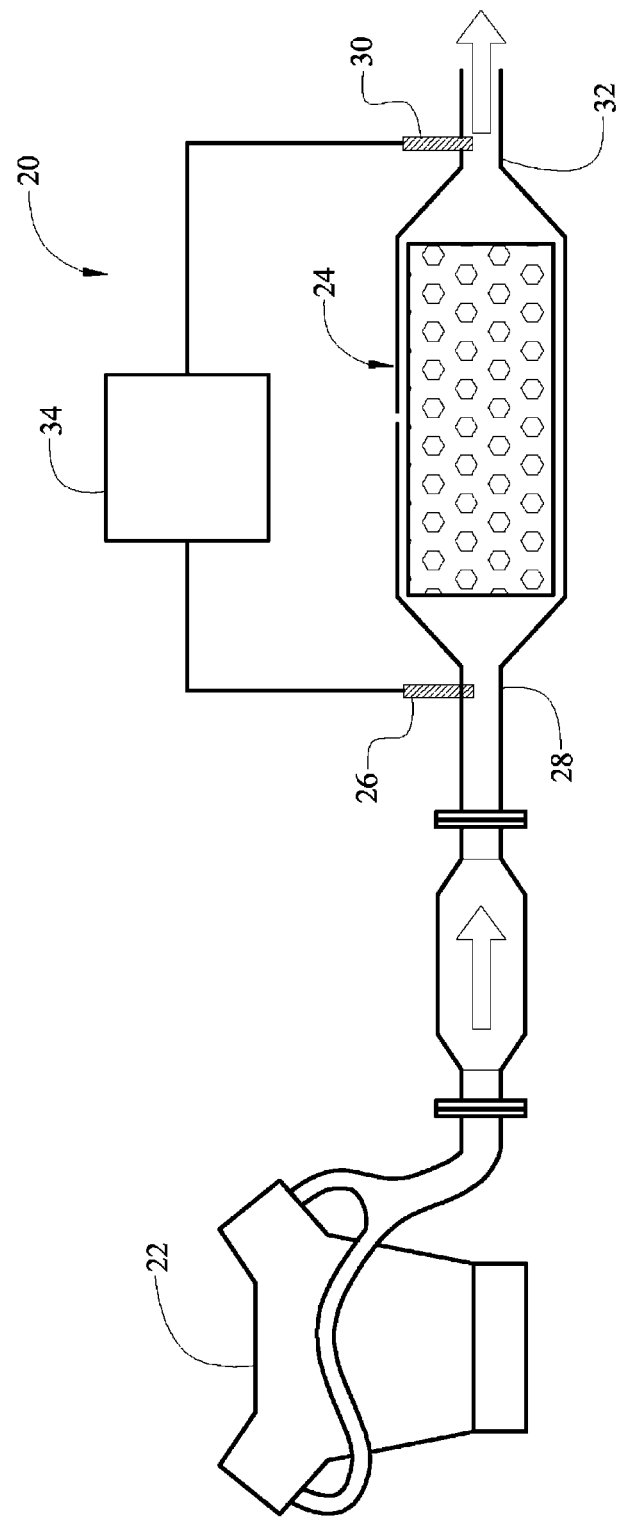
FIG. 1 is a schematic diagram of an engine and an exhaust system of a vehicle.

Referring to FIG. 1, wherein like numerals indicate like parts throughout the several views, an exhaust system of a vehicle is shown generally at 20. The exhaust system 20 directs and treats exhaust gas from an engine 22.

The exhaust system 20 includes a particulate filter 24. The particulate filter 24 filters particulate matter, i.e., soot, from the exhaust gas of the engine 22. The particulate filter 24 may include one or more substrates that define a plurality of apertures, through which the exhaust gas must flow. The particulate matter collects on the substrate as the exhaust gas flows through the apertures. The particulate filter 24 is occasionally regenerated to remove the collected particulate matter. Regeneration of the particulate filter 24 includes heating the particulate filter 24 to a temperature sufficient to burn the collected particulate matter, which converts the particulate matter to carbon dioxide that dissipates into the atmosphere.

A soot model may predict when regeneration of the particulate filter 24 is required. A pressure differential across the particulate filter 24, i.e., a pressure difference between a first pressure sensor 26 disposed at an upstream end 28 of the particulate filter 24 and a second pressure sensor 30 disposed at a downstream end 32 of the particulate filter 24, is one of the primary inputs into the soot model. The soot model uses the pressure differential to predict if or when regeneration of the particulate filter 24 is required.

Auxiliary regeneration triggers may also be used to determine if regeneration of the particulate filter 24 is required. The auxiliary regeneration triggers may include but are not limited to a pre-defined time between consecutive regenerations, a pre-defined distance traveled by the vehicle between consecutive regenerations, or pre-defined fuel consumption of the vehicle between consecutive regenerations. Accordingly, upon the occurrence of any of the auxiliary triggers, regeneration of the particulate filter 24 may be started.

The vehicle may include a controller 34, such as but not limited to an engine control unit, to control the start and stop of the regeneration of the particulate filter 24. The controller 34 may include a computer and/or processor, and include all software, hardware, memory, algorithms, connections, sensors, etc., necessary to manage and control the regeneration of the particulate filter 24. As such, a method, described below and generally shown in FIG. 2 at 40, may be embodied as a program operable on the controller 34. It should be appreciated that the controller 34 may include any device capable of analyzing data from various sensors, comparing data, and making the necessary decisions required to control the regeneration of the particulate filter 24.

Figure 2:
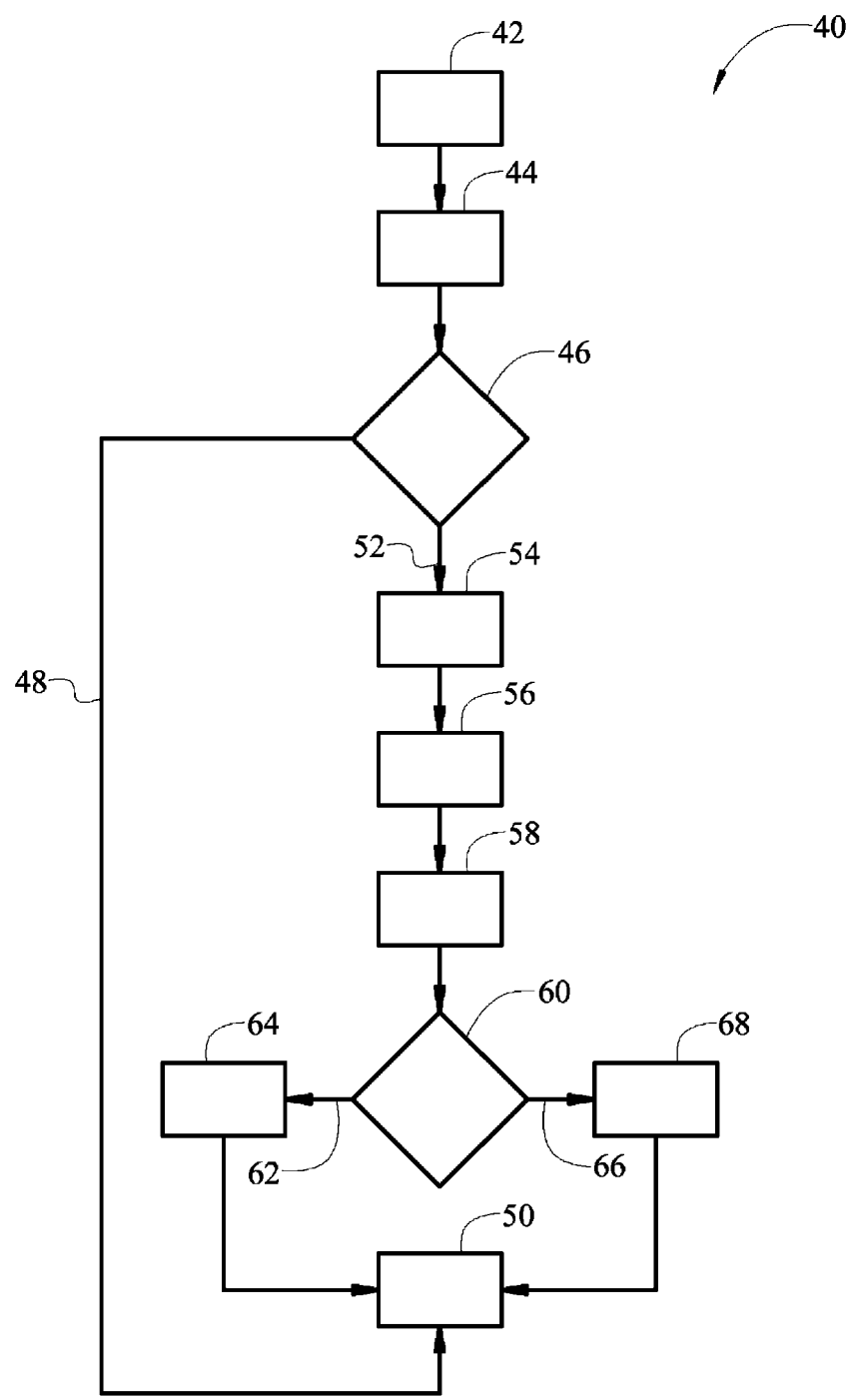
FIG. 2 is a flow chart showing a method of controlling regeneration of a particulate filter of the exhaust system.

Referring to FIG. 2, the method 40 includes sensing a pressure differential between an upstream pressure of the particulate filter 24 and a downstream pressure of the particulate filter 24, block 42. As described above, the exhaust system 20 may include the first pressure sensor 26 disposed upstream of the particulate filter 24 and the second pressure sensor 30 disposed downstream of the particulate filter 24. The first pressure sensor 26 and the second pressure sensor 30 are in communication with and transmit data to the controller 34 related to the fluid, i.e., pressure of the exhaust gas upstream of the particulate filter 24 and downstream of the particulate filter 24 respectively. The controller 34 may receive the data related to the upstream pressure and the downstream pressure, and calculate the pressure differential therebetween. However, it should be appreciated that the upstream pressure and the downstream pressure may be sensed, and the pressure differential therebetween determined in some other manner not described herein.

The method 40 further includes inputting the sensed pressure differential into the soot model, block 44. The soot model is a model of the soot mass trapped in and by the particulate filter 24 for given pressure differentials between the upstream end 28 and the downstream end 32 of the particulate filter 24. Accordingly, the soot model predicts the amount of soot, i.e., particulate matter trapped and/or contained within the particulate filter 24 for any given pressure differential. The sensed pressure differential is input into the soot model to predict how much soot is in the particulate filter 24, and thereby determine when regeneration of the particulate filter 24 is required.

The method 40 may further include determining if the soot model predicts a soot mass that requires regeneration of the particulate filter 24, block 46. If the soot model does predict a soot mass that requires regeneration of the particulate filter 24, i.e., the pressure differential is greater than a pre-determined threshold associated with a high soot mass requiring regeneration of the particulate filter 24, indicated at 48, then the controller 34 may start regeneration of the particulate filter 24, block 50.

If the soot model does not predict a soot mass that requires regeneration of the particulate filter 24, i.e., the pressure differential is below the pre-determined threshold associated with a high soot mass requiring regeneration of the particulate filter 24, indicated at 52, then the method 40 further includes defining a regeneration trigger limit for at least one operating parameter of the vehicle, block 54. The regeneration trigger limit for the operating parameter may be referred to as an auxiliary regeneration trigger. Each regeneration trigger limit is an upper limit associated with one of the operating parameters of the vehicle. The operating parameter of the vehicle may include, but is not limited to, at least one of a distance traveled by the vehicle, an operational time of the vehicle and a fuel consumption of the vehicle. The regeneration trigger limit for reach of the operating parameters of the vehicle defines a condition at which the particulate filter 24 is regenerated. Accordingly, upon the regeneration trigger limit being satisfied, regeneration of the particulate filter 24 starts. For example, the operating parameter of the vehicle may include an overall distance traveled since the last regeneration of the particulate filter 24. The regeneration trigger limit is the distance the vehicle may travel before the next regeneration of the particulate filter 24 occurs. The controller 34 may receive information from an odometer, or some other sensor, indicating the distance traveled, and determine if the distance traveled by the vehicle is less than, equal to or greater than the regeneration trigger limit. If the distance traveled by the vehicle is equal to or greater than the regeneration trigger limit, the controller 34 may start regeneration of the particulate filter 24.

The method 40 further includes sensing at least one ambient operating condition, and sensing at least one vehicle operating condition, block 56. The at least one ambient operating condition and the vehicle operating condition may be continuously sensed, or intermittently sensed. The at least one ambient operating condition may include, but is not limited to, at least one of an air temperature and an air pressure. The at least one vehicle operating condition may include, but is not limited to, at least one of a velocity of the vehicle, an engine 22 speed of the vehicle and a fuel consumption rate of the vehicle. The ambient operating conditions and the vehicle operating conditions may be sensed by various sensors located throughout the vehicle and in communication with the controller 34, for providing data related to the ambient operating conditions and the vehicle operating conditions. It should be appreciated that the ambient operating conditions and the vehicle operating conditions may be sensed in some other manner not described herein.

The method 40 may further include classifying the operation of the vehicle into one of a plurality of driving cycles, based upon the sensed at least one ambient operating condition and the sensed at least one vehicle operating condition, block 58. The different driving cycles represent different driving conditions in which the vehicle is being operated. Each of the different driving cycles produces a different soot rate. Accordingly, classifying the operation of the vehicle into the different driving cycles defines how much time the vehicle has been operated at the different soot producing levels associated with the different driving cycles.

The method 40 may further include determining if the driving cycles at which the vehicle is operated are associated with higher levels of soot production than the soot model predicts, or with lower levels of soot production than the soot model predicts, block 60.

The method 40 may further include modifying the regeneration trigger limit based upon the sensed at least one ambient operating condition and the sensed at least one vehicle operating condition. The regeneration trigger limit is modified to define a modified regeneration trigger limit. Modification of the regeneration trigger limit is based upon an aggregate time the vehicle is operated in each of the plurality of drive cycles, between consecutive regenerations of the particulate filter 24. Accordingly, the modified regeneration trigger limit accounts for the different amount of soot produced during the different driving cycles.

When the sensed at least one ambient operating condition and the sensed at least one vehicle operating condition indicate that the vehicle is operating in a drive cycle that produces lower levels of soot, i.e., particulate matter, than the soot model predicts, indicated at 62, then modifying the regeneration trigger limit to define the modified regeneration trigger limit may include increasing a time period between consecutive regenerations of the particulate filter 24, block 64. Alternatively, when the sensed at least one ambient operating condition and the sensed at least one vehicle operating condition indicate the vehicle is operating in a drive cycle that produces higher levels of soot, i.e., particulate matter, than the soot model predicts, indicated at 66, then modifying the regeneration trigger limit to define the modified regeneration trigger limit may include decreasing a time period between consecutive regenerations of the particulate filter 24, block 68. It should be appreciated that the controller 34 may modify each of the regeneration trigger limits associated with their respective operating parameter of the vehicle as described above. Accordingly, the modified regeneration trigger limit reflects the conditions in which the vehicle is operated. If the vehicle is operated in conditions that produce less soot than the soot model predicts, then the modified regeneration trigger limit may extend the time period between consecutive regenerations of the particulate filter 24, thereby increasing fuel efficiency and extending the expected life expectancy of the particulate filter 24 and other associated parts and/or components of the vehicle.

The method 40 further includes regenerating the particulate filter 24 when the modified regeneration trigger limit for the operating parameter is reached, block 50. Accordingly, the controller 34 starts regeneration of the particulate filter 24 based upon the model predicting a certain soot mass in the particulate filter 24, or when the modified regeneration trigger limit is satisfied, whichever occurs first.

While the best modes for carrying out the invention have been described in detail, those familiar with the art to which this invention relates will recognize various alternative designs and embodiments for practicing the invention within the scope of the appended claims.

The invention claimed is:

1. A method of controlling regeneration of a particulate filter of an exhaust system of a vehicle, the method comprising:
    defining a regeneration trigger limit for at least one operating parameter of the vehicle;
    sensing at least one ambient operating condition;
    sensing at least one vehicle operating condition;
    classifying the operation of the vehicle into one of a plurality of driving cycles based upon the sensed at least one ambient operating condition and the sensed at least one vehicle operating condition;
    modifying the regeneration trigger limit based upon an aggregate time the vehicle is operated in each of the plurality of drive cycles since the previous regeneration of the particulate filter to define a modified regeneration trigger limit; and
    regenerating the particulate filter when either the modified regeneration trigger limit for the operating parameter is reached, or when a soot model predicts that regeneration is required based upon a measured pressure differential between an upstream pressure of the particulate filter and a downstream pressure of the particulate filter.

2. A method as set forth in claim 1 further comprising sensing the pressure differential between an upstream pressure of the particulate filter and a downstream pressure of the particulate filter.

3. A method as set forth in claim 2 further comprising inputting the sensed pressure differential into the soot model to predict when regeneration of the particulate filter is required.

4. A method as set forth in claim 1 wherein the at least one operating parameter includes at least one of a distance traveled by the vehicle, an operational time of the vehicle and a fuel consumption of the vehicle.

5. A method as set forth in claim 1 wherein the at least one ambient operating condition includes at least one of an air temperature and an air pressure.

6. A method as set forth in claim 1 wherein the at least one vehicle operating condition includes at least one of a velocity of the vehicle, an engine speed of the vehicle and a fuel consumption rate of the vehicle.

7. A method as set forth in claim 1 wherein modifying the regeneration trigger limit based upon the sensed at least one ambient operating condition and the sensed at least one vehicle operating condition to define a modified regeneration trigger limit includes increasing a time period between consecutive regenerations of the particulate filter when the sensed at least one ambient operating condition and the sensed at least one vehicle operating condition indicate that the vehicle is operating in a drive cycle that produces lower levels of particulate matter than the soot model predicts.

8. A method as set forth in claim 1 wherein modifying the regeneration trigger limit based upon the sensed at least one ambient operating condition and the sensed at least one vehicle operating condition to define a modified regeneration trigger limit includes decreasing a time period between consecutive regenerations of the particulate filter when the sensed at least one ambient operating condition and the sensed at least one vehicle operating condition indicate that the vehicle is operating in a drive cycle that produces higher levels of particulate matter than the soot model predicts.

9. A method of controlling regeneration of a particulate filter of an exhaust system of a vehicle, the method comprising:
    sensing a pressure differential between an upstream pressure of the particulate filter and a downstream pressure of the particulate filter;
    inputting the sensed pressure differential into a soot model to predict when regeneration of the particulate filter is required;
    defining a regeneration trigger limit for at least one operating parameter of the vehicle;
    sensing at least one ambient operating condition;
    sensing at least one vehicle operating condition;
    classifying the operation of the vehicle into one of a plurality of driving cycles based upon the sensed at least one ambient operating condition and the sensed at least one vehicle operating condition;
    modifying the regeneration trigger limit based upon an aggregate time the vehicle is operated in each of the plurality of drive cycles since the previous regeneration of the particulate filter to define a modified regeneration trigger limit; and
    regenerating the particulate filter when either the modified regeneration trigger limit for the operating parameter is reached, or the soot model predicts that regeneration is required.

10. A method as set forth in claim 9 wherein the at least one operating parameter includes at least one of a distance traveled by the vehicle, an operational time of the vehicle and a fuel consumption of the vehicle.

11. A method as set forth in claim 9 wherein the at least one ambient operating condition includes at least one of an air temperature and an air pressure.

12. A method as set forth in claim 9 wherein the at least one vehicle operating condition includes at least one of a velocity of the vehicle, an engine speed of the vehicle and a fuel consumption rate of the vehicle.

13. A method as set forth in claim 9 wherein modifying the regeneration trigger limit based upon the sensed at least one ambient operating condition and the sensed at least one vehicle operating condition to define a modified regeneration trigger limit includes increasing a time period between consecutive regenerations of the particulate filter when the sensed at least one ambient operating condition and the sensed at least one vehicle operating condition indicate that the vehicle is operating in a drive cycle that produces lower levels of particulate matter than the soot model predicts.

14. A method as set forth in claim 9 wherein modifying the regeneration trigger limit based upon the sensed at least one ambient operating condition and the sensed at least one vehicle operating condition to define a modified regeneration trigger limit includes decreasing a time period between consecutive regenerations of the particulate filter when the sensed at least one ambient operating condition and the sensed at least one vehicle operating condition indicate that the vehicle is operating in a drive cycle that produces higher levels of particulate matter than the soot model predicts.

\* \* \* \* \*